US009260896B2

(12) United States Patent
Lloreda et al.

(10) Patent No.: US 9,260,896 B2
(45) Date of Patent: Feb. 16, 2016

(54) SYSTEMS, METHODS, AND DEVICES FOR SECURING CARGO

(71) Applicant: Commercial Finance Corporation, SA de Panama, Panama (PA)

(72) Inventors: Mauricio Lloreda, Bogota (CO); Ivan Lopez, Bogota (CO); Daniel Herrera, Bogota (CO)

(73) Assignee: Commercial Finance Corporation, SA de Panama, Panama (PA)

( * ) Notice: Subject to any disclaimer, the term of this patent is extended or adjusted under 35 U.S.C. 154(b) by 45 days.

(21) Appl. No.: 14/166,696

(22) Filed: Jan. 28, 2014

(65) Prior Publication Data

US 2014/0218218 A1    Aug. 7, 2014

Related U.S. Application Data

(60) Provisional application No. 61/757,631, filed on Jan. 28, 2013, provisional application No. 61/784,905, filed on Mar. 14, 2013.

(51) Int. Cl.
*E05C 19/18* (2006.01)
*E05B 39/00* (2006.01)
*G08G 1/00* (2006.01)
*E05B 83/08* (2014.01)

(52) U.S. Cl.
CPC .............. *E05C 19/186* (2013.01); *E05B 39/005* (2013.01); *E05B 83/08* (2013.01); *G08G 1/207* (2013.01)

(58) Field of Classification Search
CPC ......... B60R 25/102; G08G 1/207; G08G 1/20

USPC ............... 340/989, 539.13, 539.11; 701/408; 702/188, 189
See application file for complete search history.

(56) References Cited

U.S. PATENT DOCUMENTS

| 7,848,905 | B2 | 12/2010 | Troxler et al. |
| 8,886,216 | B1* | 11/2014 | Crossno et al. ............ 455/456.1 |
| 2005/0009521 | A1 | 1/2005 | Preece |
| 2005/0232747 | A1 | 10/2005 | Brackmann et al. |
| 2006/0019609 | A1* | 1/2006 | Finley et al. .................... 455/68 |

(Continued)

FOREIGN PATENT DOCUMENTS

WO    2007/008055 A1    1/2007

*Primary Examiner* — Steven Lim
*Assistant Examiner* — Hongmin Fan
(74) *Attorney, Agent, or Firm* — Ellen M. Bierman; Lowe Graham Jones PLLC

(57) ABSTRACT

Enhanced methods and systems for securing and monitoring cargo are described. Some examples provide a cargo monitoring system ("CMS") that is configured to track, identify, and report about anomalous conditions or events related to cargo shipments. The CMS may include a software system that receives conditions information from electromechanical locks that secure cargo. The locks include data terminals that facilitate near real time monitoring of cargo. The electromechanical locks are installed on the bars or other mechanism (e.g., door rings) that lock the doors of a cargo container, train car, van door, or the like. The data terminals include logic that is configured to transmit to the CMS information about current conditions, such as location, temperature, lock status (e.g., open, closed), tamper attempts, and the like. The cargo monitoring system interprets the received information and performs various actions based thereon, such as to transmit alerts if anomalous conditions are detected.

21 Claims, 16 Drawing Sheets

(56) References Cited

U.S. PATENT DOCUMENTS

| | | | |
|---|---|---|---|
| 2006/0109107 A1* | 5/2006 | Staton et al. | 340/539.13 |
| 2007/0115101 A1* | 5/2007 | Creekbaum et al. | 340/426.22 |
| 2008/0004798 A1* | 1/2008 | Troxler et al. | 701/207 |
| 2009/0021369 A1* | 1/2009 | Ulrich | 340/539.13 |
| 2009/0289772 A1* | 11/2009 | Lee et al. | 340/10.4 |
| 2011/0150272 A1* | 6/2011 | GunasekaranBabu et al. | 382/103 |
| 2012/0235791 A1* | 9/2012 | Donlan et al. | 340/10.1 |

* cited by examiner

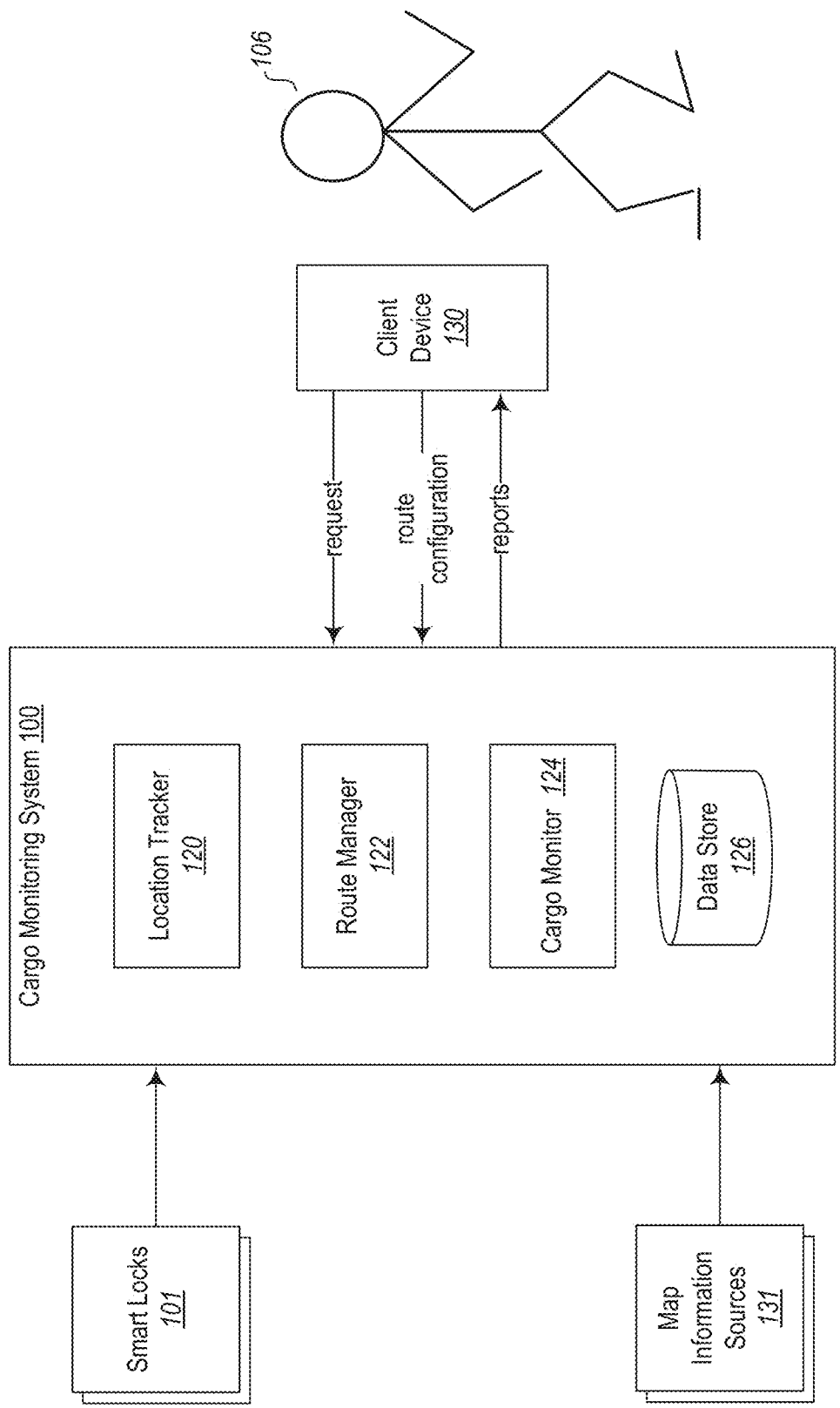

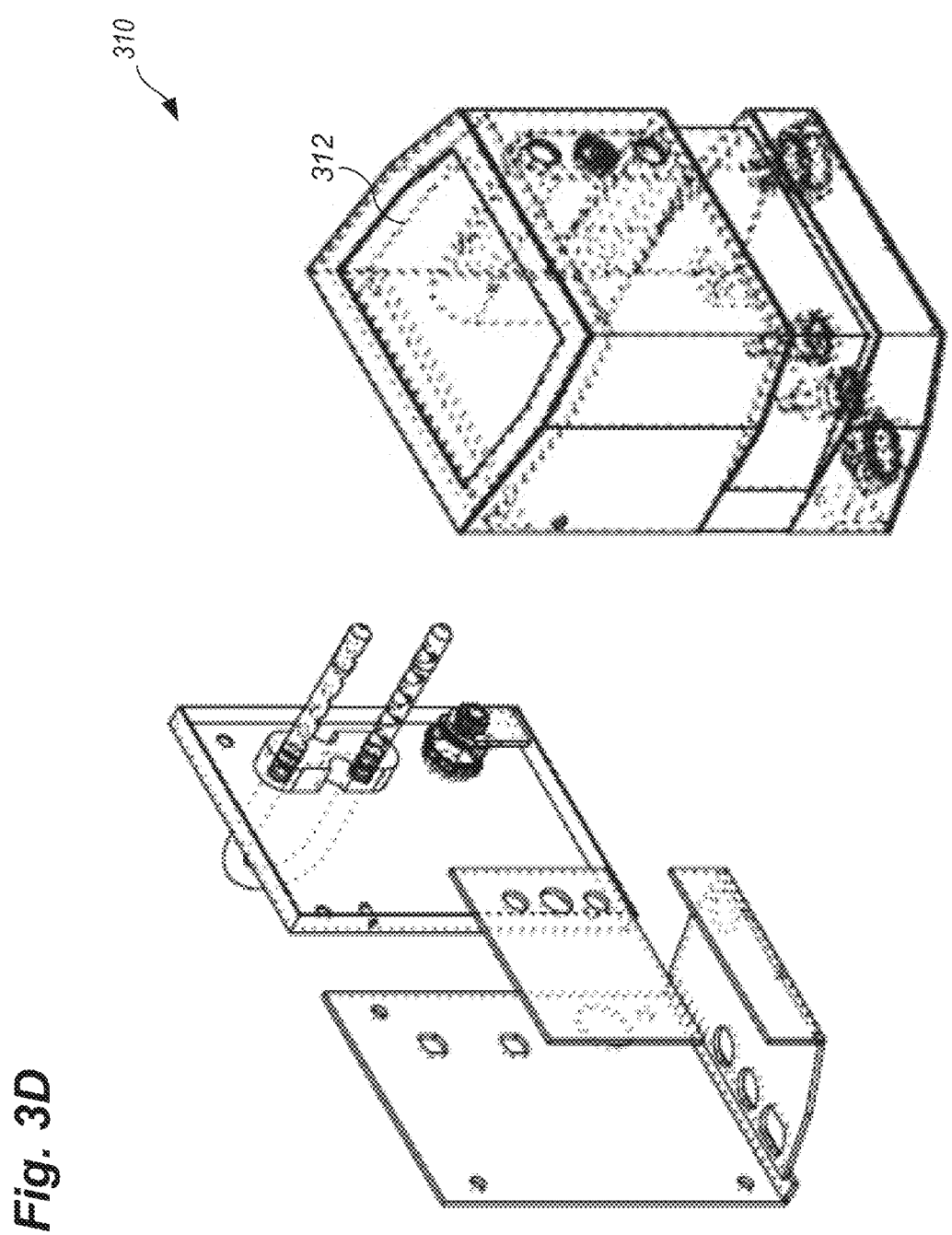

*Fig. 4.1*
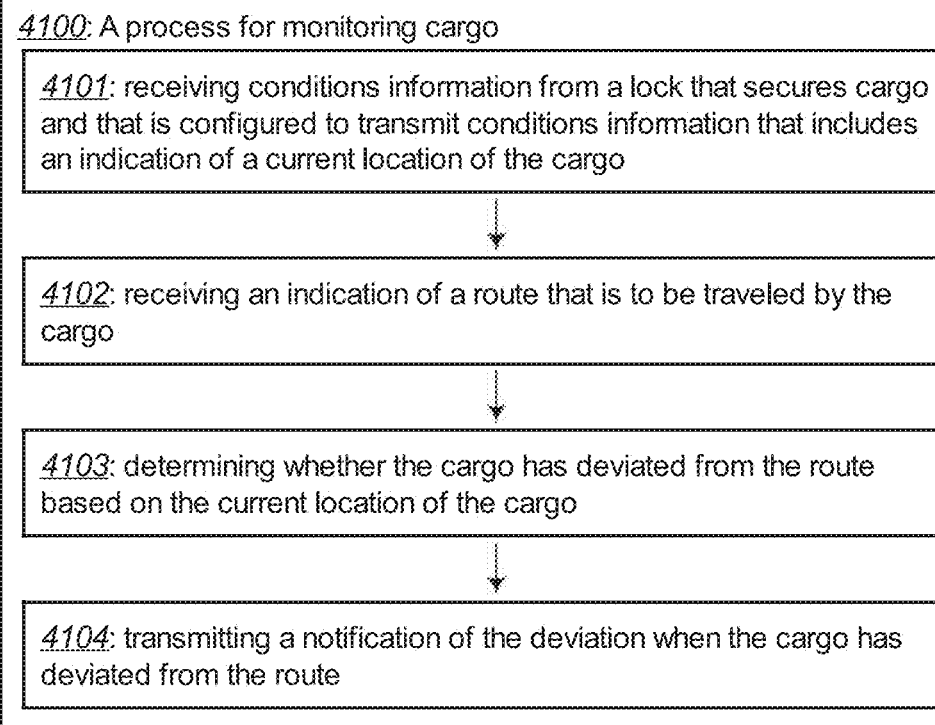
*Fig. 4.2*
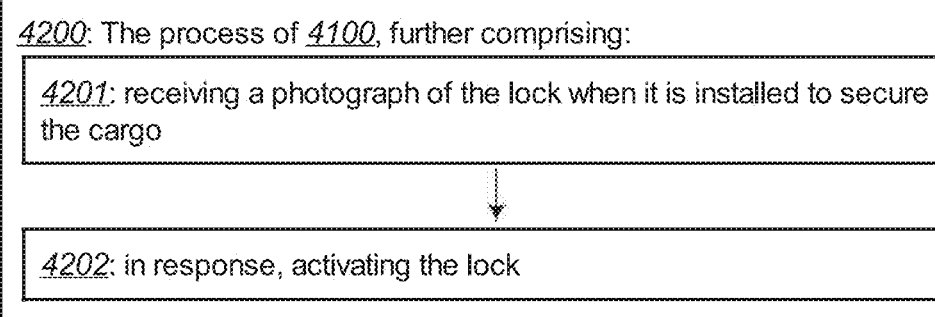

Fig. 4.3

*4300*: The process of *4100*, wherein the receiving an indication of a route includes:

*4301*: receiving an indication of a road segment that must be traveled by the cargo

Fig. 4.4

*4400*: The process of *4300*, wherein the determining whether the cargo has deviated from the route includes:

*4401*: determining, based on the current location of the cargo, that the cargo container is no longer on the road segment

Fig. 4.5

*4500*: The process of *4300*, wherein the determining whether the cargo has deviated from the route includes:

*4501*: determining, based on the current location of the cargo, that the cargo is traveling in a disallowed direction along the road segment

*Fig. 4.6*

4600: The process of 4300, wherein the determining whether the cargo has deviated from the route includes:

4601: determining, based on the current location of the cargo, that a vehicle carrying the cargo has made a U-turn

*Fig. 4.7*

4700: The process of 4300, wherein the determining whether the cargo has deviated from the route includes:

4701: determining, based on the current location of the cargo, a current distance to a destination for the cargo

4702: determining that the current distance is greater than a previously determined distance to the destination

*Fig. 4.8*

4800: The process of 4300, further comprising:

4801: receiving an indication of multiple road segments that must be traveled by the cargo, the multiple road segments specified via an interactive mapping user interface

*Fig. 4.9*

4900: The process of 4100, wherein the receiving an indication of a route includes:

4901: receiving an indication of a location or region where travel or stopping is or is not allowed

*Fig. 4.10*

41000: The process of 4100, further comprising:

41001: determining, based on the conditions information, that a vehicle carrying the cargo is wandering prior to entering the route

41002: in response, transmitting a notification that the vehicle is wandering

*Fig. 4.11*

41100: The process of 4100, further comprising:

41101: determining, based on the conditions information, a current or average speed of a vehicle carrying the cargo

41102: when the speed exceeds a specified threshold, transmitting a notification

*Fig. 4.12*

*41200*: The process of *4100*, further comprising:

*41201*: determining that conditions information has not been received from the lock

*Fig. 4.13*

*41300*: The process of *4100*, further comprising:

*41301*: providing multiple notification levels, including a first level for informational messages, a second level for warning messages, and a third level for serious alert messages

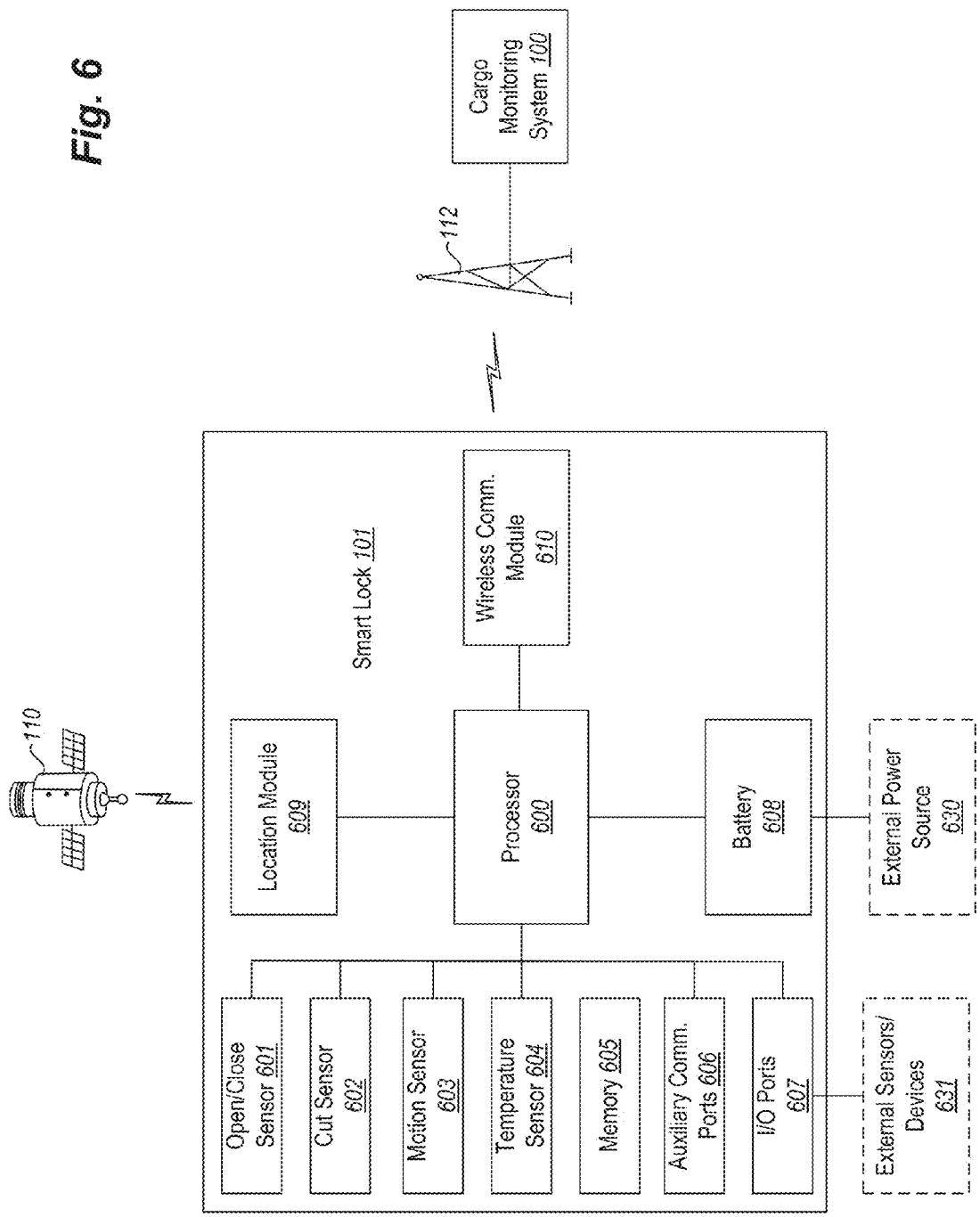

SYSTEMS, METHODS, AND DEVICES FOR SECURING CARGO

TECHNICAL FIELD

The present disclosure relates to methods, techniques, and systems for monitoring cargo that is secured via smart locks, such as by tracking and identifying anomalous conditions related to the cargo.

BRIEF DESCRIPTION OF THE DRAWINGS

FIG. 1B is an example block diagram showing logical elements of a cargo monitoring system according to an example embodiment.

FIGS. 3A-3E are views of example smart locks according to example embodiments.

FIGS. 4.1-4.13 are flow diagrams of cargo monitoring processes performed by example embodiments.

FIG. 6 is a block diagram showing components of an example smart lock according to an example embodiment.

DETAILED DESCRIPTION

Embodiments described herein provide enhanced methods and systems for securing and monitoring cargo. The described techniques apply to cargo units, including cargo containers, refrigerated containers ("reefers"), vans, train cars or wagons, air cargo containers, and the like.

Some embodiments provide a cargo monitoring system that is configured to track, identify, and report about anomalous conditions or events related to cargo shipments. The cargo monitoring system may be or include a software system that receives conditions information from electromechanical locks that secure cargo. The locks include data terminals that facilitate real time (or near real time) monitoring of cargo. The electromechanical locks (sometimes also referred to as "smart locks") are installed on the bars or other mechanism (e.g., door rings) that lock the doors of a cargo container, train car, van door, or the like. The data terminals include logic that is configured to provide (e.g., transmit, send, upload) to the cargo monitoring system information about current conditions, including one or more of location, temperature, lock status (e.g., open, closed), tamper attempts, and the like. The information provided to the cargo monitoring system by a data terminal may be transmitted in various ways, such as via satellite, cellular network, local area network (e.g., Wi-Fi hotspots), short range network (e.g., Bluetooth), or the like. The cargo monitoring system interprets the received information and performs various actions based thereon, such as to transmit alerts if anomalous conditions are detected.

1. System Overview

Figure 1A:
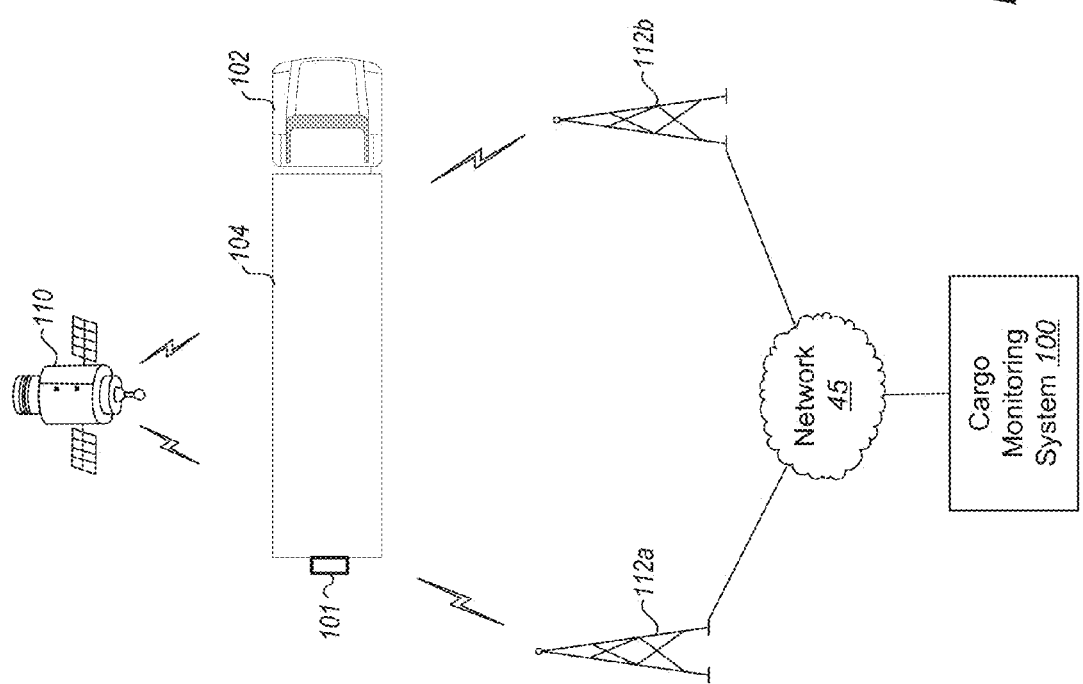
FIG. 1A is an example block diagram of a cargo monitoring system according to an example embodiment.

FIG. 1A is an example block diagram of a cargo monitoring system according to an example embodiment. FIG. 1A shows a cargo monitoring system ("CMS") 100 that is configured to track the movement of cargo, determine whether the cargo has departed or deviated from a specified route, and transmit notifications regarding such deviations or other conditions. In the illustrated example, a truck 102 carries a cargo container 104 that is secured with a smart lock 101. The smart lock 101 determines its current location based on a signal obtained from a GPS satellite 110. The smart lock 101 may also or instead determine its location based on other information, such as cellular network location information, wireless network location information, road-side beacons, or the like. The smart lock 101 then transmits conditions information (including an indication of its current location) via cellular equipment 112 and a corresponding network 45 to the system 100. The smart lock 101 may also or instead use other network facilities, such as Wi-Fi, Bluetooth, or the like. The conditions information transmitted by the smart lock 101 may include other information, including lock state, temperature, acceleration, position, inclination, and the like.

The CMS 100 performs functions such as those described below with respect to FIG. 4*. In general, and as described further below, the CMS 100 detects, identifies or determines anomalous conditions or events based on the conditions information received from smart locks. Such events may include deviations from a predicted or planned route of travel, the occurrence of a U-turn, a lock intrusion, attempted door removal (from a container), excessive speed, stopping in known dangerous locations, and the like. When such events/conditions are identified by the CMS 100, the CMS transmits notifications, which may include messages, alarms, alerts, or the like. The CMS 100 may provide a hierarchy or escalation structure of notifications or actions that are performed in response to detected anomalous conditions, such as using text messaging to transmit informational messages and initiating telephone calls to transmit warnings or alarms (e.g., for detected intrusions).

FIG. 1B is an example block diagram showing logical elements of a cargo monitoring system according to an example embodiment. FIG. 1B shows a cargo monitoring system ("CMS") 100 comprising a location tracker 120, a route manager 122, a cargo monitor 124, and a data store 126. The CMS 100 interacts with a client device 130 operated by a user 106. The CMS 100 also receives information from one or more smart locks 101 and map information sources 131. In the following, the CMS 100 is for convenience and readability sometimes described as receiving information about or from a cargo unit (e.g., a container, truck, van, or the like), when in actuality the information is received from a smart lock associated with the cargo unit.

The location tracker 120 tracks the location of cargo units based on information received from the smart locks 101. The location tracker 120 receives conditions information from the smart locks 101, and stores the received information in the data store 126 for use by other components of the CMS 100. The received conditions information typically includes a lock identifier and at least an indication of the current location of the smart lock. Other conditions information may include temperature, acceleration, inclination, and the like.

The route manager 122 manages cargo routes. In some embodiments, the route manager 122 may provide an interactive user interface (e.g., a mapping interface) that can be presented on the client device 130 and used by the user 106 to interactively establish a route. The route may be drawn or otherwise indicated on a map by the user 106. Map information may be initially obtained from map information sources 131, which include any map or geographic information source, including public or proprietary mapping systems, GIS systems, or the like. Having established a route, the route can be named and stored in the data store 126, so that it can be later associated with one or more cargo shipments. A route may be represented in various ways, such as a sequence of road segments, points, lines, areas/regions, or the like, through which a given cargo unit must travel.

The cargo monitor 124 monitors cargo units as they travel their associated routes. For each cargo unit and corresponding smart lock 101, the cargo monitor 124 access the data store 126 to obtain conditions information received from the smart lock 101 and route information associated with the smart lock 101. The cargo monitor 124 cross references the current location of the smart lock 101 against the route, in order to determine whether the cargo unit has deviated from the route. The cargo monitor 124 may also or instead check other conditions information to determine whether other anomalous conditions are present, including temperatures (e.g., too high or too low), excess speed, excess acceleration/inclination, or the like.

The cargo monitor 124 may send alerts and other types of reports to the client device 130. For example, deviations from an assigned route or other anomalous conditions may result in an alert being transmitted by the cargo monitor 124. As another example, the cargo monitor 124 may provide location or general conditions updates in response to specified triggers/conditions, such as time-based triggers (e.g., every hour), distance-based triggers (e.g., every 50 km traveled), location-based triggers (e.g., when a specified city or town is reached), or the like. Alerts and reports may be transmitted using various mechanisms, including email, text message, automated telephone call, Web page update, or the like.

In some embodiments, the cargo monitor is initially provided with (1) a photograph of a duly installed smart lock, taken and sent via the Internet or other mechanism to the CMS, and (2) a corresponding activation signal sent by the smart lock once it is installed. Having received this information the cargo monitor 124 begins monitoring the progress of the lock over its assigned route.

The cargo monitor 124 may also or instead be able to detect, interpret, and correspondently transmit an alert if the cargo unit is still parked or "wandering" before entering the network of roads that make part and form the route. Also, once the cargo unit does enter the road chosen for the beginning of such a route, the CMS transmits an alert about the real beginning of the monitored voyage. Once the cargo unit travels the entire programmed route (e.g., reaches the destination), the CMS transmits a corresponding alert all interested parties.

The cargo monitor 124 may also or instead support concepts such as rest areas, authorized stopping/wandering zones, and/or hazardous areas. For example, a route may specify specific areas in which a cargo unit may stop, or may stop for up to a specified, predetermined, or configured length of time, such as a safe rest area or refueling facility. An authorized wandering zone may be specified to give the cargo unit driver some freedom to select the best route based on local conditions and knowledge. For example, a wandering area may be specified at the beginning of a route, to give the driver freedom in selecting the best route to the entrance to the highway or other main road over which the route travels. Maximum times may be associated with wandering zones, so as to assure that the cargo unit exits the wandering zone and resumes the route within a limited amount of time. A route may also or instead specify particular areas in which the cargo unit may not stop, or may not stop for more than some length of time. If a cargo unit is determined to have stopped in a hazardous area, the cargo monitor 124 may transmit an alert.

The cargo monitor 124 may also or instead track cargo unit speed, such as to detect excessive speeds. A route may include associated speed limits, possibly on a segment-by-segment basis. By tracking location reports provided by a smart lock, the cargo monitor 124 can determine an average speed over two or more location reports. If the speed exceeds a specified maximum, the cargo monitor 124 may transmit an alert. Speed limits may be manually applied and/or be obtained from map information sources 131.

The cargo monitor 124 may also or instead determine an estimated time of arrival. The estimated time of arrival may be determined based on current position, current speed, upcoming road conditions information, and the like. The cargo monitor 124 may transmit the estimated time of arrival as part of a status report or other communication.

The cargo monitor 124 may also or instead determine a direction of travel and/or whether a U-turn has been performed. Direction of travel may be determined by reference to various types of information, such as compass information provided by the smart lock, successive GPS coordinates, distance to/from the destination or other route marker, or the like. For example the cargo monitor 124 may detect that the distance between the cargo unit and the destination is increasing (rather than decreasing), thus indicating that the cargo unit is traveling away from the destination. If the cargo monitor 124 determines that the cargo unit has reversed course, it may transmit an alert.

The cargo monitor 124 may handle intermittent communication and/or other communication problems in various ways. Ordinarily, the cargo monitor 124 will transmit an alert when it has not received a communication from a smart lock for a specified (or predetermined, configured, or otherwise designated) amount of time (e.g., 5 minutes, 10 minutes). In some cases, specific portions of the route may be designated as regions of poor cellular coverage. When a cargo unit enters such a route portion, the cargo monitor 124 may elect not to transmit any alerts (because the lack of communication is expected), and may determine an estimated time when the cargo unit is expected to emerge from the area and re-establish communication. If there is no communication at or after the estimated time, the cargo monitor may transmit an alert to indicate that no communication is being received from the cargo unit.

The CMS 100 provides alert level and/or escalation functions. For example, messages sent by the CMS 100 to the client device 130 may be coded (e.g., color coded) to indicate a level or type of message. For example, a green message may indicate a normal conditions report/update. A yellow message may indicate a warning, such as that communication from a smart lock has ceased for more than 2 minutes but less than 5 minutes. A red message may indicate a critical warning, such as that communication from a smart lock has ceased for more than 5 minutes.

In addition to coding messages to reflect the type or severity of the condition, the CMS 100 may utilize different communication channels depending on the type or level of condition. For example, critical warnings may be transmitted by text message and via an automated telephone call, whereas informational messages may be provided to a Web page, which can be checked as needed by the user 106. Different parties may also be specified. For example, please or security services may be notified of critical conditions (e.g., lock breach), whereas a message indicating arrival at a destination may be transmitted only to the shipping and receiving parties.

2. Example User Interface Aspects

Figure 2A:
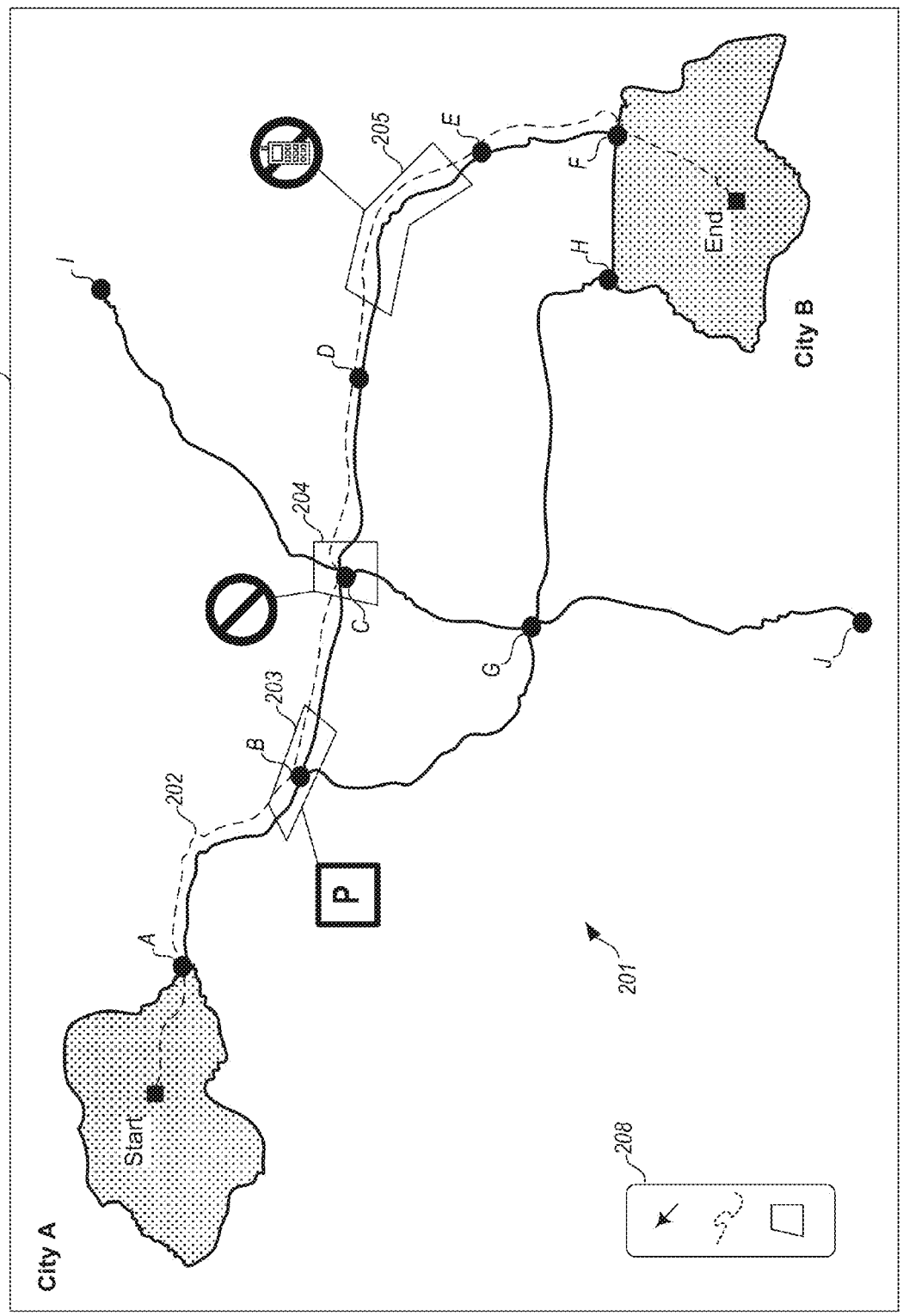
FIGS. 2A and 2B are user interface screens provided according to an example embodiment.
Figure 2B:
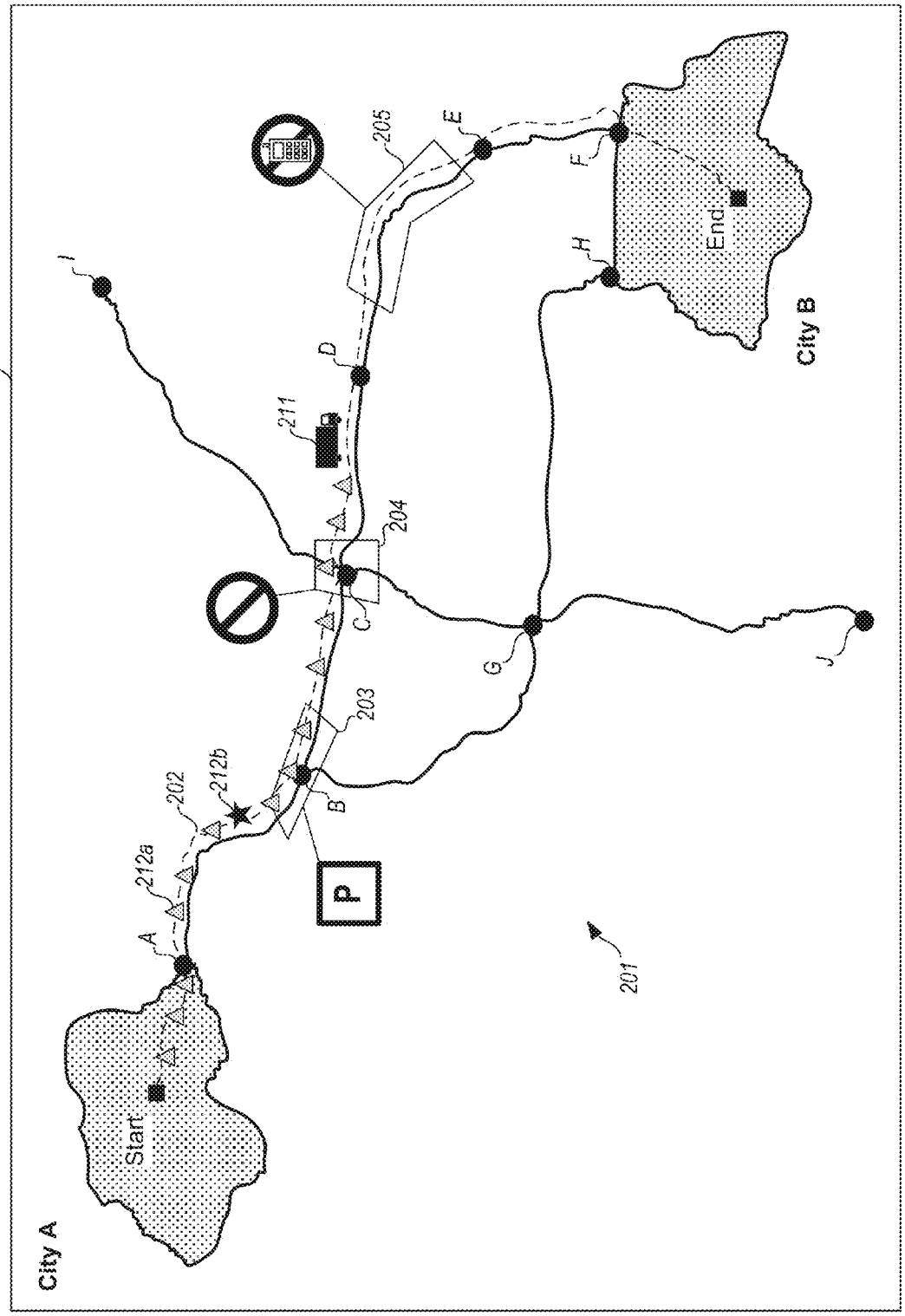

FIGS. 2A and 2B are user interface screens provided according to an example embodiment. In particular, FIG. 2A shows a user interface screen 200 that is configured to specify, design, or modify a cargo route. The user interface screen 200 presents a map 201 of a road network that connects two cities, labeled City A and City B. The road network comprises multiple connected road segments, each segment connecting two endpoints labeled A-I. Thus, the illustrated road network includes road segments AB, BC, CD, DE, EF, BG, GJ, GH, GC, and CI. City A and City B are represented as shaded regions each containing a respective square-shaped point labeled Start and End. The points Start and End represent the beginning and ending points of a route 202, discussed below.

The road network shown in the map 201 is annotated with a cargo route 202, indicated as a dashed line connecting two points labeled Start and End, and passing along road segments AB, BC, CD, DE, and EF. The road segments of the route 202 are the road segments along with the cargo unit is expected to travel. Deviations from the route 202 will cause the CMS to transmit an alert or other report indicating the deviation. For example, if the cargo unit travels over segments BG and BH to reach City B, the CMS will transmit a report that the unit has deviated from the required route 202.

The depicted user interface may be interactive, in that it may be configured to receive user inputs that specify the required road segments or other constraints or properties of the route 202. In the illustrated example, the screen 200 includes a tool selection control 208. The selection control 208 includes icons for selecting various interactive tools that can be used to select or modify the segments of the route 200, the draw new segments, and to specify constraint regions, as described further below.

The cargo route 202 is further annotated with regions 203-205 that are used to indicate areas associated with special conditions, triggers, or otherwise differential handling or processing by the CMS. The regions 203-205 may be specified via the user interface by selecting an appropriate tool from the control 208, such that the user can select, draw or otherwise specify the shape and/or type of the region. Different shapes may be supported, including circles, ellipses, rectangles, trapezoids, arbitrary polygons, or the like.

Region 203 is designated a "parking" or "resting" region, which has been identified as a safe place for stopping the cargo unit for purposes such as driver rest, refueling, vehicle maintenance, or the like. In one example embodiment, the default behavior of the CMS is to issue an alert if a cargo unit stops anywhere for longer than a default stop time (e.g., 5 minutes). However, if the cargo unit pauses its travels in the region 203 for longer than the default allowed stop time, the CMS will not issue an alert, as it is expected and allowed for the cargo unit to take a break from its travels within region 203. The user may also specify a maximum allowed stop time (e.g., 30 minutes) associated with the region 203, so that the CMS will issue an alert if the cargo unit stops for longer than that time.

Region 204 is designated a "no-stopping" or "hazardous" region, which has been identified as a region in which the cargo unit is not allowed to stop. For example, region 204 may be associated with high crime, such that there is a substantial risk of the cargo unit being stolen or otherwise compromised, particularly if the cargo unit stops for a substantial length of time. If the cargo unit pauses its travels in region 204 for any time (or longer than a specified, default, or determined time), the CMS will send an alert. The alert transmitted in this circumstance may also or instead be escalated, such as by using different or multiple communication mechanisms (e.g., placing a telephone call rather than or in addition to sending a text message).

Region 205 is designated a "poor communication" region, which has been identified as a regions in which cellular coverage and communication is poor, not possible, or otherwise degraded. As the cargo unit enters region 205, the CMS will estimate the time at which the cargo unit should exit the region 205. During this time period, the CMS will not send alerts or warnings related to a lack of communication received from the cargo unit, because such a lack of communication is expected. If the cargo unit does not resume communication at or around the expected exit time, the CMS will begin to transmit notifications of that fact, possibly in an escalating manner, based on the length of the delay. In addition, the CMS may transmit a notification when the cargo unit enters region 205, so that an operator or other person is made aware this condition.

As discussed, the described techniques may support the concept of "wandering." In this example, the route 202 provides the cargo unit with flexibility in terms of routing decisions while the unit is within the boundaries of City A and City B. This allows the cargo unit to wander and select the best or preferred route (e.g., based on local conditions) between the Start point and point A (the beginning of road segment AB) and between point F and the End point. Note that even though the cargo unit is allowed to wander within Cities A and B, the CMS will continue to monitor the location and progress of the unit, so that anomalous conditions can still be detected, such as long stops, sudden accelerations, steep inclinations, significant temperature changes, and the like.

FIG. 2B shows a user interface screen 210 that is configured to present information about tracked cargo. The screen 210 presents the map 201 and route 202 described with respect to FIG. 2A, above. In addition, the map 201 is annotated with an indication of a truck 211 that reflects the current (or most recently reported) location of a tracked cargo unit. The map 201 is also annotated with markers 212, here shown as triangles (e.g., marker 212a) and stars (e.g., marker 212b).

A triangle-shaped marker such as marker 212a indicates that a normal conditions report was transmitted by (and received from) the cargo unit at or about the indicated location. In some embodiments, a user can click on the marker 212a to obtain additional information, such as the GPS coordinates, temperature readings, and the like.

A star-shaped marker such as marker 212b indicates that an alert was transmitted by the cargo unit at or about the corresponding location. For example, the cargo unit may have stopped for longer than a default stopping time, an excessive temperature reading may have been obtained, excessive vibration or tilt may have been detected, or the like. The marker 212a may also be interactive, such that a mouse click or hover will result in the presentation of additional information about the alert.

In other embodiments, other or additional user interface techniques may be employed. For example, color coding may be used to reflect a degree of severity, temperature readings, or the like. As another example, multiple cargo units may be tracked at the same time and via the same screen. Auditory annotations may also be included.

3. Example Smart Locks

Figure 3A:
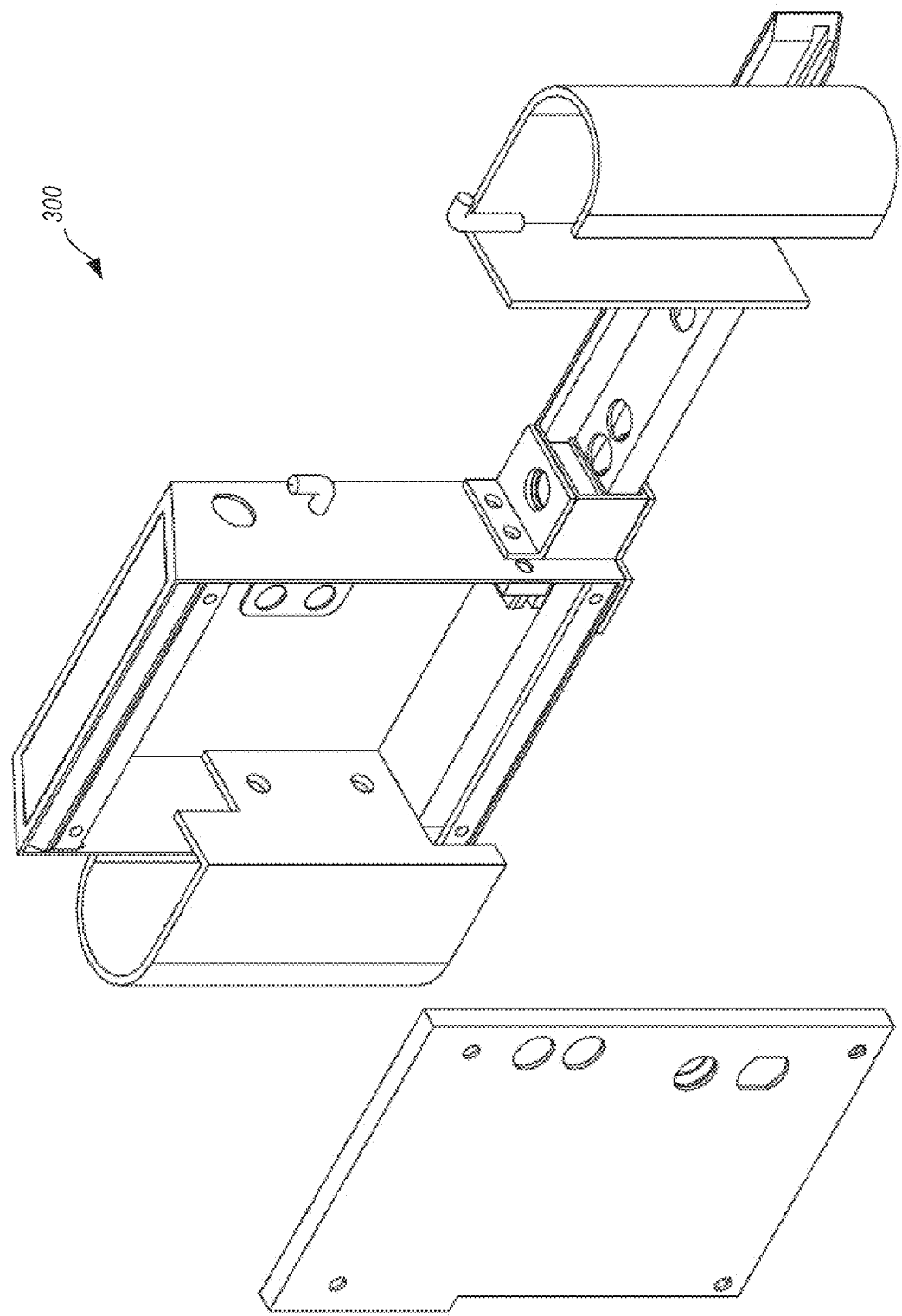
Figure 3B:
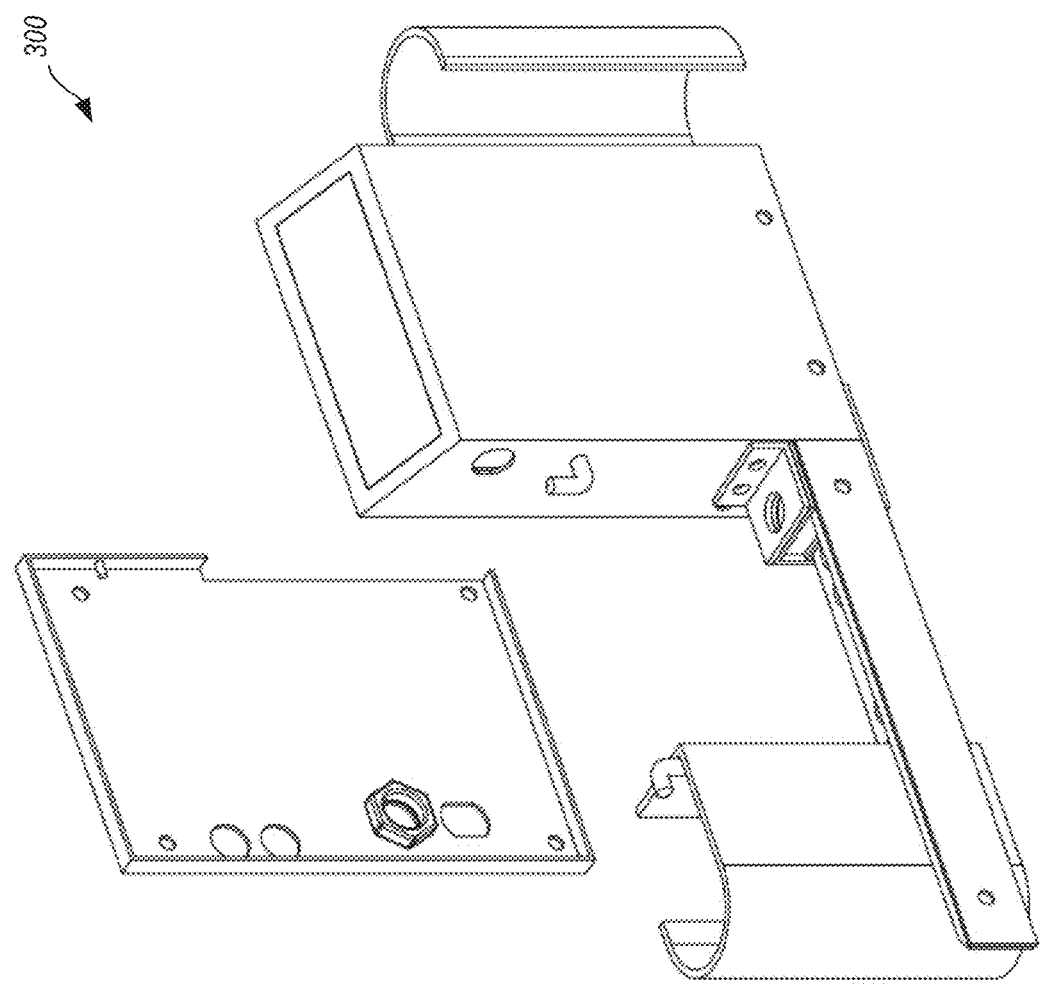
Figure 3C:
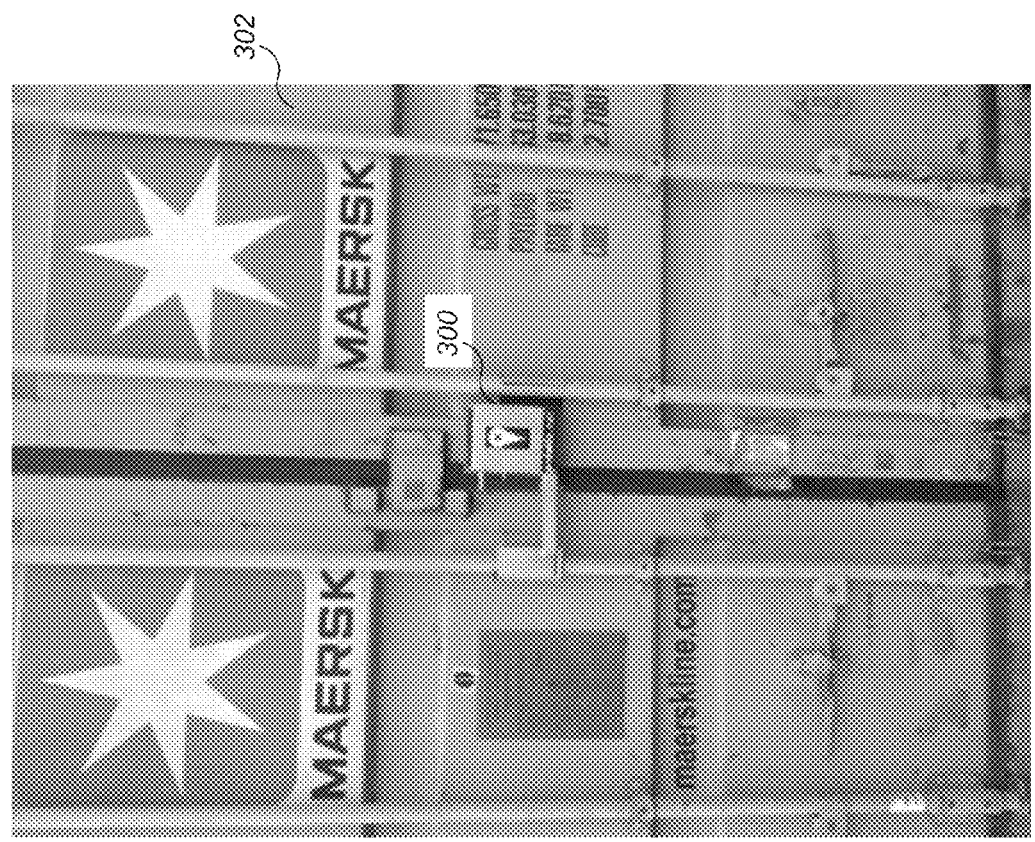

FIGS. 3A-3E depict example smart locks according to example embodiments. FIGS. 3A-3C are views of a first example smart lock 300 that is configured to secure a shipping container. In particular, FIG. 3A is a front perspective view of the smart lock 300. FIG. 3B is a rear perspective view of the smart lock 300. FIG. 3C is an image showing the smart lock 300 as deployed to secure a shipping container.

The illustrated smart lock 300 includes built-in electronic sensors, designed and installed to detect the locking or unlocking of the unit by a standard "Bottle Seal/Lock". On detection, the unit reports installation or uninstallation. By way of this detection, the smart lock also reports its due installation on the cargo unit (e.g., a shipping container). Similarly, the smart lock also detects the moment in which a bottle seal is removed, generating the corresponding report. The smart lock also has built-in sensors configured to detect if the unit is removed from the container in an unconventional way, such as by cutting its arms. If such a breach is detected, the smart lock immediately triggers a corresponding alarm. The smart lock also includes self-calibrating electronic sensors that are configured to understand and report the spatial position in which the unit was installed. If the unit exits the position initially set by these sensors, the unit may trigger an alarm. The smart lock also detects changes in the position or angle of the container's doors, doors removal and unit removal.

The smart lock 300 also includes a battery meter that monitors its battery level, reporting it to the CMS. The system has a pre-programmed set of standards to determine when a battery is OK, when the battery is draining, and when the battery enters an emergency status. A low level battery may also be programmed as an automatic report. In some embodiments, the smart lock supports three different kinds of energy consumption: "Deep Savings", "Middle Savings," and "Normal consumption." These may be remotely configured and modified through a wireless command, according to the needs and demands from the corresponding voyage, client indications, and the like. The smart lock sends a report when it receives a command for savings mode, acknowledging the execution of the command The smart lock 300 may allow the addition of a second set of batteries. Providing extra space in the interior of the lock of extra batteries, enhances the operational time frame for the lock, making it capable of operating on a global shipping time scale, including lengthy sea voyages. The batteries in the smart lock may also be recharged from the exterior, thereby eliminating the need to open or detach the smart lock in order to refresh its batteries.

The smart lock 300 is also configured to transmit route restart notifications. In particular, the smart lock is configured to detect when it has been stopped for a specified period of time and once it detects motion again, send a report to alert on "route resume" to the CMS.

The smart lock 300 can also be configured to vary its reporting frequency. For example, the CMS may transmit to the smart lock a signal, instruction, or other message that modifies a default reporting frequency interval (e.g., each minute, every 5 minutes, every half hour). When the smart lock receives such an instruction, it may respond by transmitting to the CMS a message that acknowledges receipt and execution of the received instruction.

The smart lock 300 is also configured to report temperature information. For example, the smart lock may periodically (or on demand) transmit a temperature value obtained from a temperature sensor that is part of the smarty lock or that is contained within the cargo container. A range of minimum and maximum temperature may be established and any deviation from the pre-defined range is reported.

The smart lock 300 generally allows connections of different types of external cables and sensors to, for example, measure temperature on the cargo. Temperature sensors may be placed in direct contact with (or even inserted into) the contents of the cargo unit. In other contexts, temperature sensors may be deployed to measure the air temperature inside of the cargo unit.

In some embodiments, the smart lock 300 is configured to transmit information via multiple communication mechanisms, including cellular (e.g., 3G, 4G), ZigBee, Wi-Fi, and the like. The smart lock may use short range communication (e.g., ZigBee or Wi-Fi) to interact with other smart locks that are in its vicinity. Such local communication may be used to implement a peer-to-peer network of multiple smart locks that monitor one another and/or that share longer range (e.g., cellular) communication services provided by one of the multiple smart locks.

The smart lock 300 may be configured to comply with global standards for container locks, so that any customs authority can open and close the smart lock without needing a third party to be present.

Figure 3E:
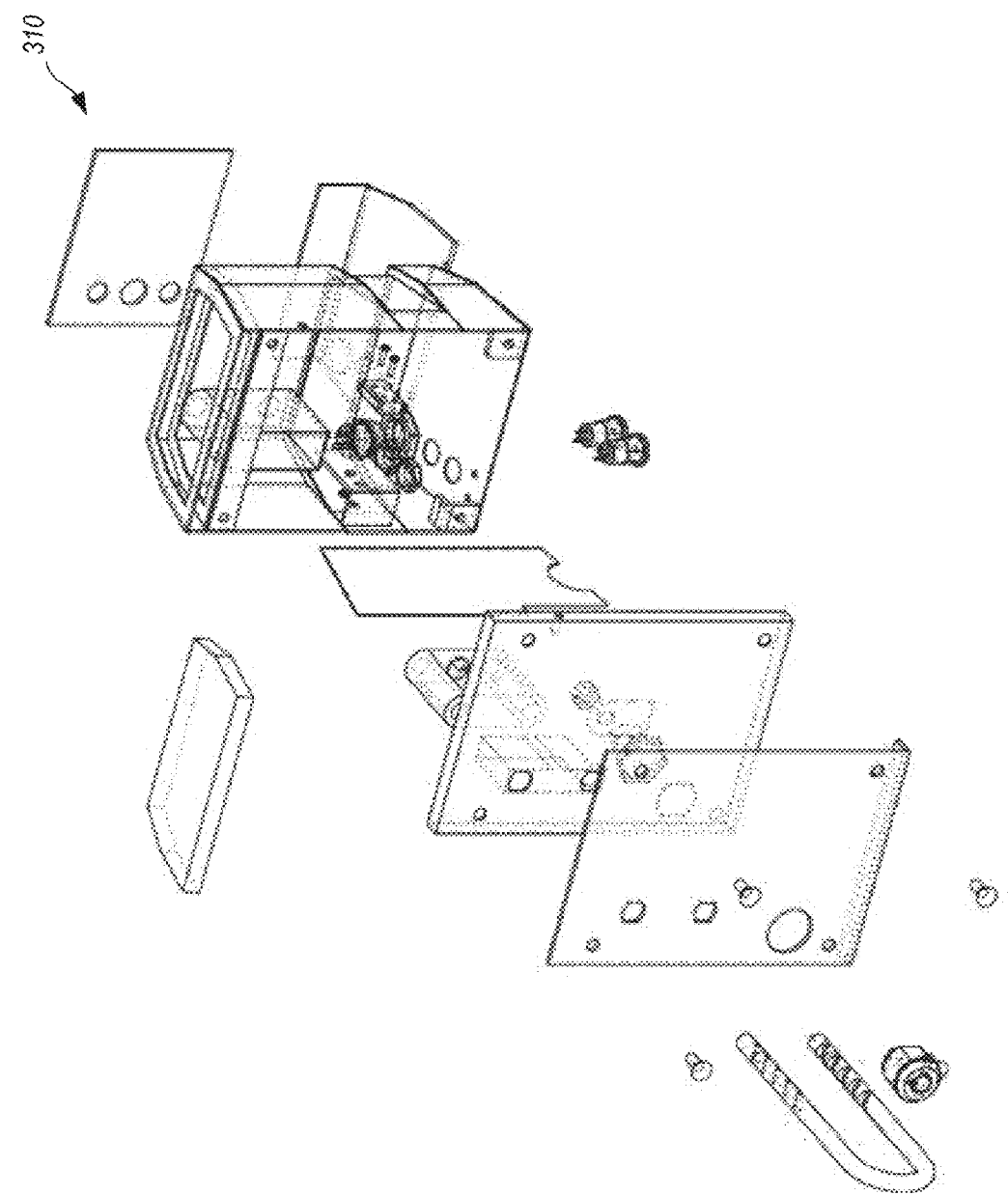

FIGS. 3D-3E are views of a second example smart lock 310 that is configured to secure a cargo van. FIG. 3D is a front perspective view of the smart lock 310. FIG. 3E is an exploded rear perspective view of the smart lock 310. Generally, the lock 310 may include any one or more of the features described above with respect to the lock 300, or other smart locks described herein.

The smart lock shown 310 in FIGS. 3D-3E includes an armored glass or equivalent surface 312 that provides for its safety and closure while allowing full wireless communications to pass through it. The other sides of the smart lock are made of stainless steel so communications cannot go through them. Internally, cavities containing the electronic and mechanical parts (e.g., sensors, communication devices) are separated and each has its corresponding drainage channels to avoid water accumulation.

The smart lock 310 secures a van via a scalable lock of a multistep (or "stair") type of closure, which allows the lock 310 to adapt to a substantial majority of vans on the market.

The lock 310 is configured to provide for easy handling and installation by the end user. User can operate the lock with a single hand, thus providing for efficient installation and removal in the context of urban delivery processes. The surface of the lock 310 may be covered in rubber to avoid damage to the van due to vibration while installed or impact.

The lock 310 includes sufficient battery power to transmit reports every 5 minutes for at least 8 days. The reports include at least GPS positions, but may include other data, such as temperature readings, accelerometer readings, and the like.

Other types or configurations of smart locks may be provided. In particular, smart locks that include or exclude one or more of the above features may be employed in order to practice at least some of the described techniques.

4. Example Processes

FIGS. 4.1-4.13 are example flow diagrams of cargo monitoring processes performed by example embodiments.

FIG. 4.1 is an example flow diagram of example logic for monitoring cargo. The illustrated logic in this and the following flow diagrams may be performed by, for example, the Cargo Monitoring System 100 described with respect to FIG. 1, above. More particularly, FIG. 4.1 illustrates a process 4100 that includes operations performed by or at the following block(s).

At block 4101, the process performs receiving conditions information from a lock that secures cargo and that is configured to transmit conditions information that includes an indication of a current location of the cargo. In some embodiments, the lock is configured to determine its location via GPS, and then transmit an indication of that location to the process. Other conditions information may be reported, including temperature, acceleration, inclination, and the like. The lock secures cargo by securing doors or other access of a shipping container, a van, or similar. In some embodiments of the smart lock, an accelerometer is included to assist in measuring information relating to acceleration, inclination, and the like.

At block 4102, the process performs receiving an indication of a route that is to be traveled by the cargo. In some embodiments, the route indication specifies road segments or portions that must be traveled by the cargo. The route information may also indicate regions where stopping is or is not allowed, expected travel time through specified route segments, maximum travel speed during specified route segments, and the like. In some embodiments, the route may be viewed as a set of constraints (geographic, temporal, physical, temperature, humidity) that must be met by the cargo during its journey. If one of the constraints is not met, an alert or other notification will be indicated. The route information may be received from any one of a number of sources, including those associated with a person or company responsible for the transport of the cargo, truck, van, or the like, and via any method of communication including manual or electronic.

At block 4103, the process performs determining whether the cargo has deviated from the route based on the current location of the cargo. The process may determine that the cargo has deviated from the route by comparing the current location of the cargo to the permitted (or planned or preferred) locations/segments identified by the route information. Such a comparison may indicate that the cargo is traveling in the wrong direction or has otherwise departed the allowed route.

At block 4104, the process performs transmitting a notification of the deviation when the cargo has deviated from the route. Various types of notification may be transmitted, including text messages, emails, automated or semi-automated telephone calls (e.g., to the truck driver, police), or the like.

FIG. 4.2 is an example flow diagram of example logic illustrating an example embodiment of process 4100 of FIG. 4.1. More particularly, FIG. 4.2 illustrates a process 4200 that includes the process 4100, and which further includes operations performed by or at the following block(s).

At block 4201, the process performs receiving a photograph of the lock when it is installed to secure the cargo. The process may receive a photograph taken and sent by, for example, a smart phone.

At block 4202, the process performs in response, activating the lock. In some embodiments, the process responds automatically to the received photo, while in other embodiments, the process waits for manual verification of the received photograph. In some embodiments, the lock may include a machine-readable identifier (e.g., bar code, QR code, digit string) that can be automatically recognized by the process in order to provide assurance that the photograph is indeed showing a lock.

FIG. 4.3 is an example flow diagram of example logic illustrating an example embodiment of process 4100 of FIG. 4.1. More particularly, FIG. 4.3 illustrates a process 4300 that includes the process 4100, wherein the receiving an indication of a route includes operations performed by or at one or more of the following block(s).

At block 4301, the process performs receiving an indication of a road segment that must be traveled by the cargo. A road segment may be indicated as one or more points, a region, a logical map segment (e.g., Highway 20 between City X and City Y) or the like. Logical map segments may then be looked up against GIS databases or other sources in order to obtain GPS (or other coordinates) that can be cross-referenced against location reports received from the lock in order to determine whether the secured cargo is traveling the correct route.

FIG. 4.4 is an example flow diagram of example logic illustrating an example embodiment of process 4300 of FIG. 4.3. More particularly, FIG. 4.4 illustrates a process 4400 that includes the process 4300, wherein the determining whether the cargo has deviated from the route includes operations performed by or at one or more of the following block(s).

At block 4401, the process performs determining, based on the current location of the cargo, that the cargo container is no longer on the road segment. By comparing the current location to locations associated with the road segment, the process may determine that the cargo is no longer on the road segment. Some embodiments include a threshold or allowable deviation, in space and/or time, so that misreported or underreported locations do not cause unnecessary alarms. For example, the process may tolerate a specified number (e.g., one or two) readings that are off route. As another example, the process may tolerate a position that is off route by less than a specified threshold amount (e.g., 50 meters). As another example, the process may receive and utilize error or uncertainty information provided by the GPS sensor of the lock, so that a route deviation that is within a reported error radius will not be reported.

FIG. 4.5 is an example flow diagram of example logic illustrating an example embodiment of process 4300 of FIG. 4.3. More particularly, FIG. 4.5 illustrates a process 4500 that includes the process 4300, wherein the determining whether the cargo has deviated from the route includes operations performed by or at one or more of the following block(s).

At block 4501, the process performs determining, based on the current location of the cargo, that the cargo is traveling in a disallowed direction along the road segment. Some embodiments track the distance between the current cargo location and the endpoint of the road segment or some other way point. When this distance decreases, a U-turn may be indicated, resulting in a warning or other notification. The disallowed direction may be an incorrect or otherwise unpermitted direction.

FIG. 4.6 is an example flow diagram of example logic illustrating an example embodiment of process 4300 of FIG. 4.3. More particularly, FIG. 4.6 illustrates a process 4600 that includes the process 4300, wherein the determining whether the cargo has deviated from the route includes operations performed by or at one or more of the following block(s).

At block 4601, the process performs determining, based on the current location of the cargo, that a vehicle carrying the cargo has made a U-turn. By tracking distance between the current location and some endpoint (e.g., final destination, end of route segment, etc.) the process can identify U-turns when the elapsed distance stops increasing and begins decreasing, or when the distance remaining stops decreasing and begins increasing. In some embodiments, U-turns may be detected by tracking a direction of travel (e.g., compass direction) based on multiple location reports (or on a compass direction provided by the smart lock). When the direction of travel reverses (e.g., turns 180 degrees), a U-turn is typically indicated.

FIG. 4.7 is an example flow diagram of example logic illustrating an example embodiment of process 4300 of FIG. 4.3. More particularly, FIG. 4.7 illustrates a process 4700 that includes the process 4300, wherein the determining whether the cargo has deviated from the route includes operations performed by or at one or more of the following block(s).

At block 4701, the process performs determining, based on the current location of the cargo, a current distance to a destination for the cargo. Some embodiments track the distance between the current cargo location and the final or intermediary destination. Distance may be measured as a straight line ("as the crow flies") or as travel distance along the road network. Some embodiments measure accumulated route distance and determine a percentage (completed and/or remaining). Using this information, the process can determine route start, proximity to destination, route completion, estimated arrival times, and the like.

At block 4702, the process performs determining that the current distance is greater than a previously determined distance to the destination. When the cargo is moving away from its destination, this is frequently an indication that the cargo has deviated from its intended route.

FIG. 4.8 is an example flow diagram of example logic illustrating an example embodiment of process 4300 of FIG. 4.3. More particularly, FIG. 4.8 illustrates a process 4800 that includes the process 4300, and which further includes operations performed by or at the following block(s).

At block 4801, the process performs receiving an indication of multiple road segments that must be traveled by the cargo, the multiple road segments specified via an interactive mapping user interface. Some embodiments provide an interactive mapping interface, so that a user may drag or select road segments that comprise an allowable route. In some embodiments, multiple routes may be specified, with the constraint that the cargo must travel at least one of the specified routes.

FIG. 4.9 is an example flow diagram of example logic illustrating an example embodiment of process 4100 of FIG. 4.1. More particularly, FIG. 4.9 illustrates a process 4900 that includes the process 4100, wherein the receiving an indication of a route includes operations performed by or at one or more of the following block(s).

At block 4901, the process performs receiving an indication of a location or region where travel or stopping is or is not allowed. Some embodiments provide for the specification of "safe" or "hazardous" areas, so that notifications may be sent in response to the cargo traveling or stopping in an area that is denoted as hazardous (or alternatively traveling or stopping in an area that is not denoted as safe).

FIG. 4.10 is an example flow diagram of example logic illustrating an example embodiment of process 4100 of FIG. 4.1. More particularly, FIG. 4.10 illustrates a process 41000 that includes the process 4100, and which further includes operations performed by or at the following block(s).

At block 41001, the process performs determining, based on the conditions information, that a vehicle carrying the cargo is wandering prior to entering the route. The process may identify conditions such as that a truck is wandering prior to entering the route, such as by navigating a port facility or city streets prior to entering a highway system. Regions where wandering is permitted may be specified via a user interface or other mechanism. In some cases, a wandering region may be associated with a time, so that a cargo unit is permitted to wander within the region for at most the specified time before an alert or other notification is transmitted.

At block 41002, the process performs in response, transmitting a notification that the vehicle is wandering. In addition, once the process determines that the wandering has concluded (and the route has been entered) another notification may be transmitted to mark the beginning of the travel.

FIG. 4.11 is an example flow diagram of example logic illustrating an example embodiment of process 4100 of FIG. 4.1. More particularly, FIG. 4.11 illustrates a process 41100 that includes the process 4100, and which further includes operations performed by or at the following block(s).

At block 41101, the process performs determining, based on the conditions information, a current or average speed of a vehicle carrying the cargo. By tracking the location of the cargo, the process may determine vehicle speed.

At block 41102, the process performs when the speed exceeds a specified threshold, transmitting a notification.

FIG. 4.12 is an example flow diagram of example logic illustrating an example embodiment of process 4100 of FIG. 4.1. More particularly, FIG. 4.12 illustrates a process 41200 that includes the process 4100, and which further includes operations performed by or at the following block(s).

At block 41201, the process performs determining that conditions information has not been received from the lock. In some embodiments, the process may determine that conditions information has not been received for more than a specified time period (e.g., five minutes). When such occurs, various actions may be taken depending on the circumstances. If it is known that the cargo is in or near a region of poor communication, the process may determine a time when the cargo is expected to leave the region, and only send an alert when no communication is received by the determined time.

FIG. 4.13 is an example flow diagram of example logic illustrating an example embodiment of process 4100 of FIG. 4.1. More particularly, FIG. 4.13 illustrates a process 41300 that includes the process 4100, and which further includes operations performed by or at the following block(s).

At block 41301, the process performs providing multiple notification levels, including a first level for informational messages, a second level for warning messages, and a third level for serious alert messages. Some embodiments provide for notification escalation, such that different types of conditions or events are reported to different parties or in different manners (e.g., text message, email, telephone call) depending on severity. For example, the process may initiate a text message for informational messages (e.g., the cargo has entered the route), an email for warning messages (e.g., communication has lapsed for five minutes), or a phone call for serious alert (e.g., alarm) messages (e.g., intrusion detected, U-turn detected).

5. Example Implementation Aspects

Figure 5:
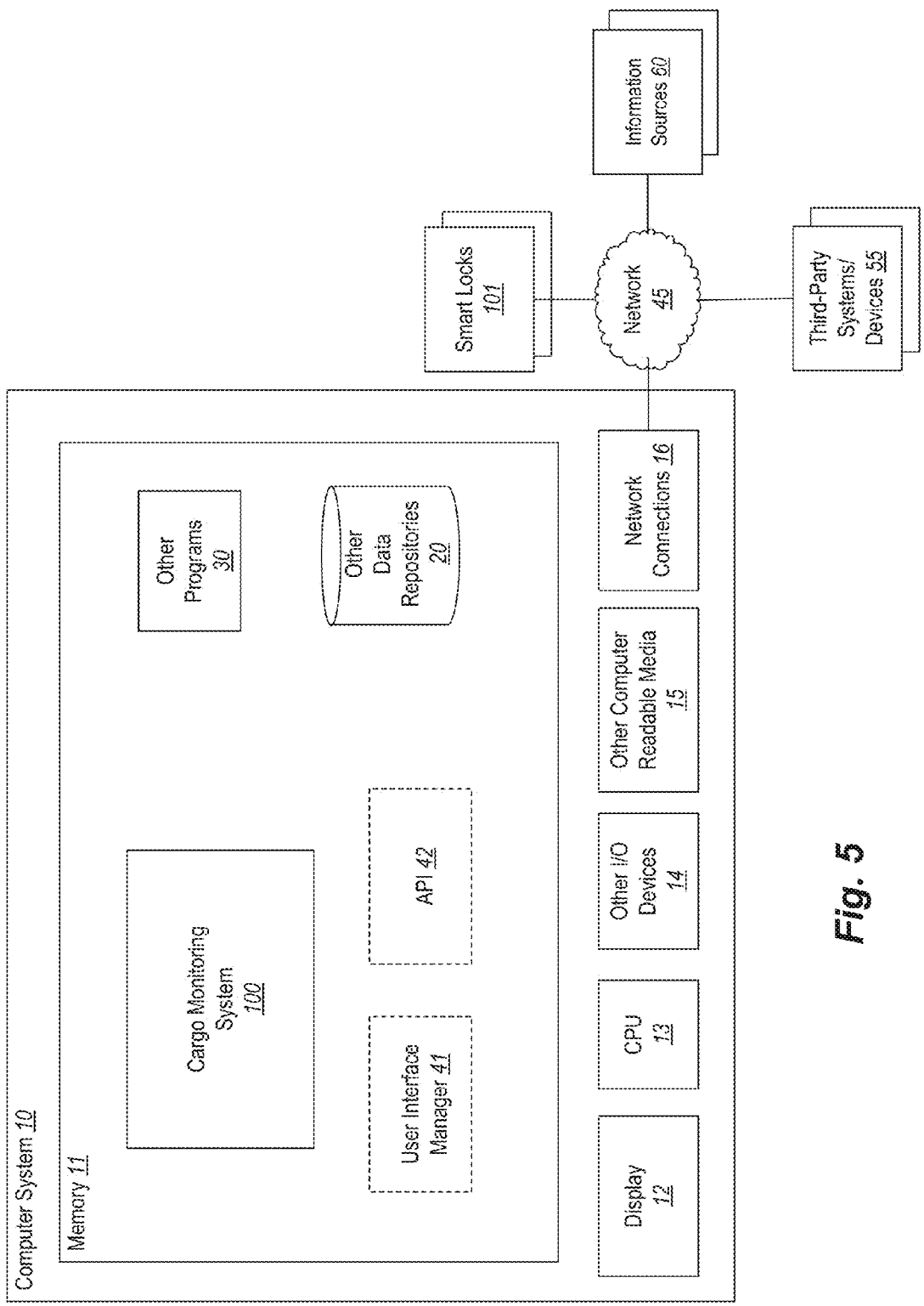
FIG. 5 is a block diagram of an example computing system for implementing a cargo monitoring system according to an example embodiment.

FIG. 5 is an example block diagram of an example computing system for implementing a Location-Based Recommendation System according to an example embodiment. In particular, FIG. 5 shows a computing system 10 that may be utilized to implement a CMS 100. Also, at least some of the implementation techniques described below with respect to the CMS 100 may be used to implement other devices, systems, or modules described herein, including the client logic 122 of the client device 120.

Note that one or more general purpose or special purpose computing systems/devices may be used to implement the CMS 100. In addition, the computing system 10 may comprise one or more distinct computing systems/devices and may span distributed locations. Furthermore, each block shown may represent one or more such blocks as appropriate to a specific embodiment or may be combined with other blocks. Also, the CMS 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The CMS 100 is shown residing in memory 11. In other embodiments, some portion of the contents, some or all of the components of the CMS 100 may be stored on and/or transmitted over the other computer-readable media 15. The components of the CMS 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 5 may not be present in any specific implementation. For example, some embodiments may not provide other computer readable media 15 or a display 12.

The CMS 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the CMS 100.

The UI manager 41 provides a view and a controller that facilitate user interaction with the CMS 100 and its various components. For example, the UI manager 41 may provide interactive access to the CMS 100, such that users can interact with the CMS 100, such as by specifying routes, tracking cargo, specifying contact information for notifications, and the like. Example user interface screens are presented with respect to FIGS. 2A and 2B, above. In some embodiments, access to the functionality of the UI manager 41 may be provided via a Web server, possibly executing as one of the other programs 30. In such embodiments, a user operating a Web browser executing on one of the devices 55 can interact with the CMS 100 via the UI manager 41.

The API 42 provides programmatic access to one or more functions of the CMS 100. For example, the API 42 may provide a programmatic interface to one or more functions of the CMS 100 that may be invoked by one of the other programs 30 or some other module. In this manner, the API 42 facilitates the development of third-party software, such as user interfaces, plug-ins, adapters (e.g., for integrating functions of the CMS 100 into Web applications), and the like.

In addition, the API 42 may be in at least some embodiments invoked or otherwise accessed via remote entities, such as code executing on one of the smart locks 101, information sources 60, and/or one of the third-party systems/devices 55, to access various functions of the CMS 100. For example, an information source 60 may push map-related information, bills of lading, cargo manifests, route information, or the like, to the CMS 100 via the API 42. The API 42 may also be configured to provide management widgets (e.g., code modules) that can be integrated into the third-party systems/devices 55 and that are configured to interact with the CMS 100 to make at least some of the described functionality available within the context of other applications (e.g., mobile apps).

The CMS 100 interacts via the network 45 with smart locks 101, information sources 60, and third-party systems/devices 55. The network 45 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/devices 55 may include any systems that provide data to, or utilize data from, the CMS 100, including Web browsers, shipping services, map services, notification services (e.g., for text messaging, emails, telephone calls), and the like.

In an example embodiment, at least some components/modules of the CMS 100 are implemented using standard programming techniques. For example, the CMS 100 may be implemented as a "native" executable running on the CPU 13, along with one or more static or dynamic libraries. In other embodiments, the CMS 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the CMS 100, such as in the data stores 20, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

FIG. 6 is a block diagram showing components of an example smart lock according to an example embodiment. FIG. 6 shows a smart lock 101 as described herein. The illustrated smart lock 101 includes a processor 600, an open/close sensor 601, a cut sensor 602, a motion sensor 603, a temperature sensor 604, a memory 605, auxiliary communication ports 606, I/O ports 607, a battery 608, a location module 609, and a wireless communication module 610.

The processor 600 may be a stand-alone CPU, a microcontroller, a system on a chip, or the like. The processor is in signal communication with the components 601-610, such as via a data bus, dedicated data ports, or the like. The processor executes instructions that implement one or more of the techniques described herein, such as battery monitoring, power save functions, communication functions, temperature monitoring, data storage, and the like. The instructions may be stored in and loaded form the memory 605 and/or in a memory (not shown) that is internal to the processor 600. The processor 600 communicates with the illustrated components by polling, interrupts, message passing, or the like.

The sensors 601-604 monitor the state of the lock 101 and/or the cargo. The sensors provide monitoring information to the processor 600, such as by raising interrupts, storing information directly in memory 604, or the like. The processor 600 may evaluate the received information, such as by determining whether data values or measurements are out of an acceptable range, and then transmitting a notification to the CMS 100.

The open/close sensor 601 is responsible for monitoring the open/closed state of the lock, and notifying the processor of state changes. The cut sensor 602 monitors the mechanical integrity of the casing and/or arms of the lock 101, in order to detect if the lock is breached or the arms are cut.

The motion sensor 603 may include one or more of an accelerometer, inclinometer, vibration sensor, or the like. The motion sensor 603 provides information about the motion of the lock to the processor 600.

The temperature sensor 604 monitors the internal and/or external temperatures of the lock. In some embodiments, an external temperature probe may be positioned inside of the cargo unit. The sensor 604 may receive readings from an external temperature sensor via I/O ports 607.

The memory 605 is responsible for storing data and/or instructions related to the operation of the lock 101. The memory 605 may be or include one or more of volatile memory (e.g., RAM), non-volatile memory (e.g., ROM), Flash memory, or the like. The memory 605 may serve as a buffer, record, or medium for data values provided by the sensor 601-604 or other components.

The ports 606 and 607 allow the lock 101 to communicate with external sensors, devices or systems 631. For example, the communication ports 606 may include USB ports, serial ports, Ethernet ports, or the like. As another example, the I/O ports 607 may be connected to an external temperature or humidity sensor.

The battery 608 provides power to the processor 608 and other components of the lock. The battery 608 is also in signal communication with the processor 608, so that the battery level can be monitored and the function of the battery can be controlled. The battery 608 also includes an external port that can be connected to an external power source 630, so that the lock 101 can be charged without opening it.

The location module 609 obtains and provides location information for the lock 101. The location module 609 may include a GPS unit and corresponding antenna configured to receive signals from one or more satellites 610.

The wireless communication module 610 performs wireless communication functions for the lock 101. The communication module 609 may include a radio, modem, identity information (e.g., SIM card), and the like, so as to communicate via a cellular network 112 with the cargo monitoring system 100. Other types of wireless communication may be supported, including Wi-Fi, satellite, or the like.

At least some elements of the smart lock 101 may be implemented as software using standard programming techniques, such as those discussed with respect to the implementation of the CMS 100 in FIG. 5, above. In addition, some embodiments of the smart lock 101 may include a greater or lesser number of components than those shown here. For example, some smart locks may not include a cut sensor 602, relying instead on a vibration sensor or other techniques to detect lock breaches.

Furthermore, in some embodiments, some or all of the components of the CMS 100 and/or smart lock 101 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/757,631, entitled "SYSTEMS, METHODS, AND DEVICES FOR SECURING AND MONITORING CARGO CONTAINERS," filed Jan. 28, 2013, and U.S. Provisional Patent Application No. 61/784,905, entitled "SYSTEMS, METHODS, AND DEVICES FOR SECURING CARGO," filed Mar. 14, 2013, is incorporated herein by reference, in its entirety.

From the foregoing it will be appreciated that, although specific embodiments have been described herein for purposes of illustration, various modifications may be made without deviating from the spirit and scope of this disclosure. For example, the methods, techniques, and systems for cargo monitoring are applicable to other architectures or in other contexts. For example, instead of monitoring cargo, the techniques could be employed to monitor persons, vehicles generally, animals, or the like. Also, the methods, techniques, and systems discussed herein are applicable to differing contexts, protocols, communication media (optical, wireless, cable, etc.) and devices (such as wireless handsets, mobile communications devices, pagers, navigation devices such as GPS receivers, etc.).

The invention claimed is:

1. A method for monitoring cargo, the method comprising:
   receiving a photograph of a lock when the lock is installed to secure cargo;
   in response, activating the lock to secure the cargo;
   receiving conditions information from the lock, wherein the lock is configured to transmit conditions information that includes an indication of a current location of the cargo;
   receiving an indication of a route that is to be traveled by the cargo;
   determining whether the cargo has deviated from the route based on the current location of the cargo; and
   transmitting a notification of the deviation when the cargo has deviated from the route.

2. The method of claim 1, wherein the lock secures a cargo container that includes the cargo.

3. The method of claim 1, wherein the lock secures a van that includes the cargo.

4. The method of claim 1, wherein the conditions information includes an indication of at least one of: a temperature, an acceleration sensed by the lock, an attempt to tamper with the lock, an inclination of the lock, a battery level within the lock, leaning of doors of a container secured by the lock, and vibration sensed by the lock.

5. The method of claim 1, wherein the receiving an indication of a route includes: receiving an indication of a road segment that must be traveled by the cargo.

6. The method of claim 5, further comprising:
   receiving indications of multiple segments that are part of the route; and
   generating a data structure that reflects the route and includes indications of the multiple segments.

7. The method of claim 5, wherein the determining whether the cargo has deviated from the route includes: determining, based on the current location of the cargo, that the cargo container is no longer on the road segment.

8. The method of claim 5, wherein the determining whether the cargo has deviated from the route includes: determining, based on the current location of the cargo, that the cargo is traveling in a disallowed direction along the road segment.

9. The method of claim 5, wherein the determining whether the cargo has deviated from the route includes: determining, based on the current location of the cargo, that a vehicle carrying the cargo has made a U-turn.

10. The method of claim 5, wherein the determining whether the cargo has deviated from the route includes:
    determining, based on the current location of the cargo, a current distance to a destination for the cargo; and
    determining that the current distance is greater than a previously determined distance to the destination.

11. The method of claim 5, further comprising: receiving an indication of multiple road segments that must be traveled by the cargo, the multiple road segments specified via an interactive mapping user interface.

12. The method of claim 1, wherein the receiving an indication of a route includes: receiving an indication of a location or region where travel or stopping is or is not allowed.

13. The method of claim 1, further comprising:
    determining, based on the conditions information, that a vehicle carrying the cargo is wandering prior to entering the route; and
    in response, transmitting a notification that the vehicle is wandering.

14. The method of claim 1, further comprising:
    determining, based on the conditions information, a current or average speed of a vehicle carrying the cargo; and
    when the speed exceeds a specified threshold, transmitting a notification.

15. The method of claim 1, further comprising: determining that conditions information has not been received from the lock.

16. The method of claim 15, further comprising:
    when the cargo is in or near a region of poor communication coverage, determine a time when the cargo is expected to exit the region of poor communication coverage; and
    when the cargo does not exit the region by the determined time, transmitting a notification.

17. The method of claim 15, further comprising:
    if the cargo is in or near a region of poor communication coverage, transmitting a notification that informs a recipient of an expected loss of communication; and
    if the cargo is not in or near a region of poor communication coverage, transmitting a notification that warns of an unexpected loss of communication.

18. The method of claim 1, further comprising: providing multiple notification levels, including a first level for informational messages, a second level for warning messages, and a third level for serious alert messages.

19. The method of claim 18, wherein the multiple notification levels each have corresponding notification mechanism including at least one of email, text message, telephone call to a contact person, and telephone call to law enforcement.

20. A non-transitory computer-readable medium including contents that are configured, when executed, to cause a computing system to perform a method for monitoring cargo, the method comprising:
    receiving a photograph of a lock when the lock is installed to secure cargo;
    in response, activating the lock to secure the cargo;
    receiving conditions information from the lock, wherein the lock is configured to transmit conditions information that includes an indication of a current location of the cargo;
    receiving an indication of a route that is to be traveled by the cargo;
    determining whether the cargo has deviated from the route based on the current location of the cargo; and
    transmitting a notification of the deviation when the cargo has deviated from the route.

21. A system for monitoring cargo, the system comprising:
    a processor;
    a memory; and
    logic instructions stored in the memory and configured, when executed by the processor, to perform a method comprising:
        receiving a photograph of a lock when the lock is installed to secure cargo;
        in response, activating the lock to secure the cargo;
        receiving conditions information from the lock, wherein the lock is configured to transmit conditions information that includes an indication of a current location of the cargo;
        receiving an indication of a route that is to be traveled by the cargo;
        determining whether the cargo has deviated from the route based on the current location of the cargo; and
        transmitting a notification of the deviation when the cargo has deviated from the route.

* * * * *